US012802142B2

(12) United States Patent
Limpkin

(10) Patent No.: US 12,802,142 B2
(45) Date of Patent: Nov. 17, 2026

(54) SYSTEMS AND METHODS FOR REAL-TIME PAYROLL DATA VALIDATION

(71) Applicant: UKG Inc., Weston, FL (US)

(72) Inventor: Richard Limpkin, Kilkenny (IE)

(73) Assignee: UKG Inc., Weston, FL (US)

( * ) Notice: Subject to any disclaimer, the term of this patent is extended or adjusted under 35 U.S.C. 154(b) by 307 days.

(21) Appl. No.: 18/476,662

(22) Filed: Sep. 28, 2023

(65) Prior Publication Data

US 2025/0111444 A1 Apr. 3, 2025

(51) Int. Cl.
*G06Q 40/12* (2023.01)

(52) U.S. Cl.
CPC .................................. *G06Q 40/125* (2013.12)

(58) Field of Classification Search
CPC .................................................... G06Q 40/125
USPC ............................................................ 705/32
See application file for complete search history.

(56) References Cited

U.S. PATENT DOCUMENTS

2020/0118219 A1* 4/2020 Mauricio ............. G06Q 10/105
2023/0368214 A1* 11/2023 Suryanarayana ...... G06Q 50/18

OTHER PUBLICATIONS

Ashraf, Sara et al. Big Data for Real-Time Processing on Streaming Data: State-of-the-art and Future Challenges. 2022 International Conference on Electrical, Computer, Communications and Mechatronics Engineering, 2022. (Year: 2022).*

* cited by examiner

*Primary Examiner* — Fawaad Haider
(74) *Attorney, Agent, or Firm* — ArentFox Schiff LLP; Michael Fainberg

(57) ABSTRACT

Disclosed herein are systems and method for payroll data validation. A method may include receiving a first user input including at least one data value associated with an employee of a company, wherein the at least one data value is used to complete payroll transactions of the company in a first geographic location; determining a data type of the at least one data value; retrieving a plurality of localization rules associated with the data type and the first geographic location; validating whether the at least one data value satisfies criteria provided by the plurality of localization rules; in response to determining that the at least one data value does not satisfy the criteria, generate, on a graphical user interface, an indication that the first user input requires review to complete the payroll transactions.

18 Claims, 11 Drawing Sheets

400

700

800

SYSTEMS AND METHODS FOR REAL-TIME PAYROLL DATA VALIDATION

FIELD OF TECHNOLOGY

The present disclosure relates to the field of data processing, and, more specifically, to systems and methods for real-time payroll data validation.

BACKGROUND

Payroll transactions are an essential part of the world economy as they provide employees with their salaries, employers with their costs, and governmental entities with fees and taxes. As companies have grown to a global scale, the complexities of payroll transactions have risen. For example, an office in a first country may have employees that are taxed differently than an office in a second country, despite both offices being associated with a single company.

One of the issues with managing payroll transactions is viewing, customizing, and validating data in a convenient manner. Firstly, there is a lack of a system that enables users to set rules based on the requirements of different geographic locations. As laws change, conventional systems tend to have high latency in change/adaption. Second, after data is entered by employees, employers, etc., the validation step is often delayed until a payroll transaction needs to be executed or a minimum amount of new data values have been entered (e.g., validation is performed for a batch of new employees rather than a single employee). While this delay certainly causes issues for an employee expecting a quick payment, it also becomes a detriment to computing devices executing the validation. For example, validating several thousand/million entries in a small period of time (e.g., right before a payment is due) puts greater stress in terms of processing and memory usage on the computing devices executing the validation.

SUMMARY

Aspects of the disclosure relate to the field of data processing. In one exemplary aspect, the techniques described herein relate to a system for payroll data validation, including: at least one memory; at least one hardware processor coupled with the at least one memory and configured, individually or in combination, to: receive a first user input including at least one data value associated with an employee of a company, wherein the at least one data value is used to complete payroll transactions of the company in a first geographic location; while receiving the first user input, validate the at least one data value of the first user input in real-time by: determining a data type of the at least one data value; retrieving a plurality of localization rules associated with the data type and the first geographic location; and validating whether the at least one data value satisfies criteria provided by the plurality of localization rules; in response to determining that the at least one data value does not satisfy the criteria, generate, on a graphical user interface, an indication that the first user input requires review to complete the payroll transactions, wherein the graphical user interface displays a view of a geographical region and the indication is generated in a portion of the geographical region associated with the first geographic location.

In some aspects, the techniques described herein relate to a system, wherein the at least one hardware processor is further configured to: receive a second user input including at least one other data value associated with a different employee of the company, wherein the at least one other data value is used to complete payroll transactions of the company in a second geographic location; and validate the at least one other data value using a different plurality of localization rules associated with the data type of the at least one other data value and the second geographic location.

In some aspects, the techniques described herein relate to a system, wherein the at least one data value is a national identification number of the employee, and wherein determining that the at least one data value does not satisfy the criteria includes determining that the national identification number has an invalid format, and wherein determining that the at least one other data value satisfies criteria of the different plurality of localization rules includes determining that the national identification number is not required to complete the payroll transactions.

In some aspects, the techniques described herein relate to a system, wherein the at least one hardware processor is further configured to: determine an amount of the criteria that the at least one data value satisfies, wherein the indication generated on the graphical user interface is a visual marker that depicts the amount of the criteria that the at least one data value satisfies.

In some aspects, the techniques described herein relate to a system, wherein the at least one data value includes a first data value and a second data value, wherein the at least one hardware processor is further configured to determine that the at least one data value does not satisfy the criteria in response to determining that the first data value contradicts and the second data value.

In some aspects, the techniques described herein relate to a system, wherein the at least one hardware processor is further configured to generate, on the graphical user interface, at least one option to correct the at least one data value.

In some aspects, the techniques described herein relate to a system, wherein the at least one hardware processor is further configured to: receive a second user input including at least one corrected data value to replace the at least one data value; validate whether the at least one corrected data value satisfies the criteria provided by the plurality of rules.

In some aspects, the techniques described herein relate to a system, wherein the at least one hardware processor is configured to: disable a payroll transaction in response to determining that the at least one data value does not satisfy the criteria.

In some aspects, the techniques described herein relate to a system, wherein the at least one hardware processor is configured to: enable a payroll transaction in response to determining that the at least one data value satisfies the criteria.

In some aspects, the techniques described herein relate to a system, wherein the at least one hardware processor is further configured to: receive, via the graphical user interface, a selection of the indication; and generate, on the graphical user interface, a view of the at least one data value with specific data values visually marked for not satisfying the criteria.

In some aspects, the techniques described herein relate to a system, wherein the first geographic location is a country and the geographic region is one or more continents.

In some aspects, the techniques described herein relate to a method for payroll data validation, including: receiving a first user input including at least one data value associated with an employee of a company, wherein the at least one data value is used to complete payroll transactions of the company in a first geographic location; while receiving the first user input, validating the at least one data value of the first user input in real-time by: determining a data type of the at least one data value; retrieving a plurality of localization rules associated with the data type and the first geographic location; and validating whether the at least one data value satisfies criteria provided by the plurality of localization rules; in response to determining that the at least one data value does not satisfy the criteria, generate, on a graphical user interface, an indication that the first user input requires review to complete the payroll transactions, wherein the graphical user interface displays a view of a geographical region and the indication is generated in a portion of the geographical region associated with the first geographic location.

In some aspects, the techniques described herein relate to a non-transitory computer readable medium storing thereon computer executable instructions for payroll data validation, including instructions for: receiving a first user input including at least one data value associated with an employee of a company, wherein the at least one data value is used to complete payroll transactions of the company in a first geographic location; while receiving the first user input, validating the at least one data value of the first user input in real-time by: determining a data type of the at least one data value; retrieving a plurality of localization rules associated with the data type and the first geographic location; and validating whether the at least one data value satisfies criteria provided by the plurality of localization rules; in response to determining that the at least one data value does not satisfy the criteria, generate, on a graphical user interface, an indication that the first user input requires review to complete the payroll transactions, wherein the graphical user interface displays a view of a geographical region and the indication is generated in a portion of the geographical region associated with the first geographic location.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
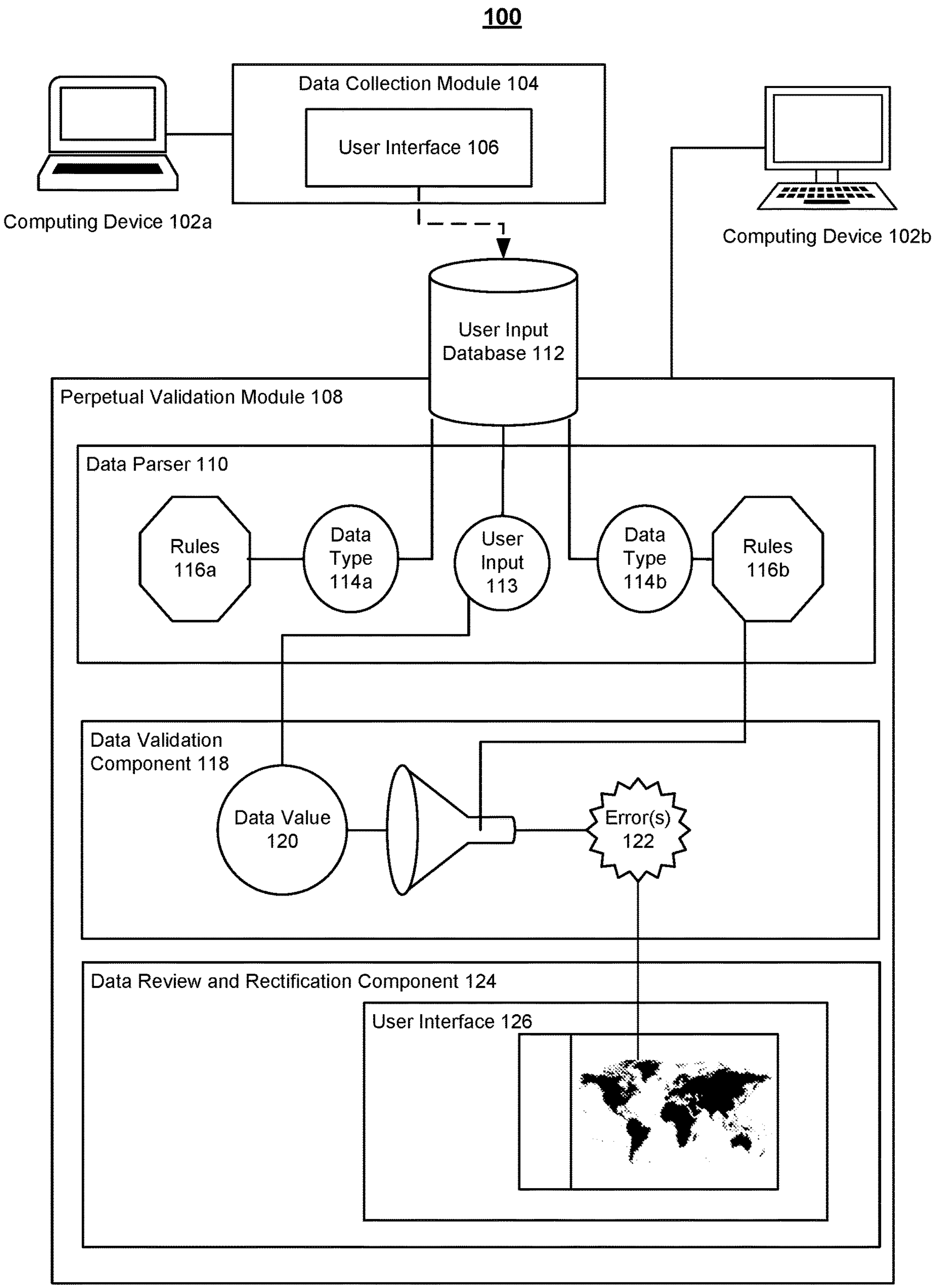
FIG. 1 is a block diagram illustrating a system for validating payroll data.

Exemplary aspects are described herein in the context of a system, method, and computer program product for real-time payroll data validation. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The systems and methods of the present disclosure describe real-time payroll data validation (also referred to as perpetual validation). Perpetual validation allows for instant validation of inputted payroll data by both systematic integrations and user inputs. Unlike traditional methods where validation is performed on delayed triggers and batches when a dataset submission is completed, perpetual validation involves applying validation and generating messages/errors in real-time as data is persisted into a database.

With the graphical user interface generated using perpetual validation, users can quickly identify data observations, warnings, and errors occurring in geographic locations around the world—with those data observations, warnings, and errors being specific to the local criteria of each geographic location.

Perpetual validation is unique from previous payroll transaction validation schemes for at least the following reasons:

(1) the overview, input, and review screens for payroll data, especially for large datasets from direct HCM integrations are unique to the platform, (2) perpetual validation reads and validates the data as it is inputted/ingested into the platform in real-time and does not need triggers or batching at later stages. The validation data is then stored in a database for rendering by the graphical user interface.

(3) the validation overlay on top of the graphical user interface allows users to see the validation results for each of the data elements inputted or ingested from HCM.

By using perpetual validation, users of the platform may greatly increase the efficiency in processing payroll by quickly seeing data summary, navigating to errors, correcting them before approval for gross to net calculations. Overall, perpetual validation is designed to quickly help users see data problems via summary user interface elements, navigate through warning and errors (which can cause employees not getting paid) and correct them in the input interfaces. As mentioned before, because perpetual validation works in the first instance when data is inputted/ingested, it creates significant value in early detection of erroneous data so that errors can be corrected before downstream processing prevents employees from being be paid on time and computing reaches a bottleneck. It also warns integrations of potential data errors coming from HCM systems.

FIG. 1 is a block diagram illustrating a system 100 for validating payroll data. System 100 includes computing device 102*a* and computing device 102*b*. For example, computing device 102*a* may be a laptop, desktop, etc., of an employee and computing device 102*b* may be a laptop, desktop, server, etc., of a company that monitors payroll information.

Computing device 102*a* may execute data collection module 104, which includes a user interface 106. User interface 106 may enable an employee to input information about themselves. For example, user interface 106 may be an interface of a web application, a standalone application, a website, etc. User interface 106 may request the employee to input various data values to build an employee profile. Data values include, but are not limited to, name, address, job title, a government-issued identification number, date of birth, marital status, number of dependents, and emergency contact.

Data collection module 104 may be configured to upload the inputs gathered via user interface 106 to a user input database 112. In particular, user input database 112 may be configured and access via perpetual validation module 108. It should be noted that user input database 112 may receive the data values from a plurality of computing devices belonging to different employees. Each data collection module 104 of a respective computing device may be connected to user input database 112 via a network (e.g., a local area network, a wide area network, etc.).

In some aspects, perpetual validation module 108 may be an application split into a thick and thin client application. The thick client application may access user input database 112 and perform validation. In some aspects, the thick client application may be executed on a remote server. The thin client application may receive validation results and generate user interface 126 on computing device 102*b*.

In an exemplary aspect, data parser 110 retrieves data in user input database 112. For example, perpetual validation module 108 may receive a first user input that includes at least one data value associated with an employee of a company. Suppose that the company is an international retailer that has multiple offices throughout the world. For example, the company may have an office in a country (e.g., France) and another office in a different country (e.g., United States). Suppose that the first user input is associated with an employee from the United States. Accordingly, the at least one data value may include a name, an address, a marital status, and a social security number. The data values may be: "John Doe" as the name, "123 John Doe St., New York 10021" as the address, "single" as the marital status, and "123-45-56789 as the social security number." It should be noted that the following examples provided are highly simplified for the sake of brevity and understanding. For example, the amount of data values received per user input may be quite large despite only four data values being given in the example.

It should also be noted that rather than be divided into countries/offices, employees may be divided into different pay groups (i.e., a group of employees paid at the same time). Each of those employees may be part of the same office or different offices.

The purpose of gathering these data values is to complete payroll transactions of the company in a given geographic location (e.g., a country). For example, an employee may provide the data values in order to enable a payback deposit in his/her bank account. The payroll transaction may need the data values for identification purposes and to perform calculations of taxation, fees, credits, salary, benefits, etc. For example, the person may have a bi-weekly paycheck deposit of $2000 and based on the information provided in the data values, the company may be able to determine the amount of tax the person owes (e.g., using marital status).

Because a company may be spread out across multiple geographic locations (e.g., cities, towns, states, provinces, countries, continents, etc.), the guidelines for performing payroll transactions may be different depending on the location of the office that the employee works in. For example, the tax rules in the United Kingdom may be different than the tax laws in the United States. Similarly, certain identifiers such as a social security number may be required in one country (e.g., the United States), but not in other countries that utilize a different identification system (e.g., a social insurance number that is used in Canada).

In a conventional approach, a user input is received and validation is not performed until a threshold number of user inputs have been received or when validation is manually launched (e.g., right before performing payroll transactions). This delayed/batch approach is inefficient because it can cause many payroll transactions to get delayed if multiple errors are detected. On a technical level, when validation is performed in one batch, a greater amount of computational resources are expended by a computing device in a short period of time. If a company has several thousands of employees, these shortcomings are exacerbated.

Accordingly, the systems and methods of the present disclosure perform data validation in real-time. For example, when a user enters data values using user interface 106, data collection module 104 may immediately upload the values to user input database 112. Perpetual validation module 108 may detect that user input database 112 has been updated and may be begin validation on the new data values received.

In an exemplary aspect, while receiving user input 113, perpetual validation module 108 validates the at least one data value (e.g., data value 120) of user input 113 in real-time. This involves first determining a data type of the at least one data value. For example, user input 113 may be [John Doe; 123 John Doe St., New York 10021; single; 123-45-56789]. For each data value, data parser 110 may identify one or more data types 114. For example, data type 114*a* may be "social security number." The icons for types name, address, marital status, etc., are not shown in FIG. 1.

Each data type and geographic location may be linked to a plurality of localization rules 116. For example, rules 116*a* may be linked with data type 114*a* and the first geographic location (e.g., the location of the office or the residential location of the employee). Suppose that user input 113 is for an employee working in the United States. Rules 116*a* represent localization rule(s) associated with social security numbers in the United States.

It should be noted that the same data type may have different rules in different geographic locations. For example, data type 114*b* may also be social security number.

However, if the geographic location is the United Kingdom, then data parser 110 retrieves rules 116*b* instead of rules 116*a*.

Localization rules establish certain criteria for a data value. For example, a rule may query the format of the data value. For example, a social security number is a 9-digit value that includes solely integers. Accordingly, one rule of rules 116*a* may indicate that the social security number must be nine digits. Other examples of localization rules may be: (1) the social security number cannot have symbols or letters; (2) the social security number should be formatted with 3 digits, followed by 2 digits, followed by 4 digits, (3) the social security number is only issued to persons that are citizens or permanent residents of the United States, etc.

From user input 113, data validation 118 may extract data value 120 (e.g., 123-45-56789) and assess the validity of the data value in view of the criteria of the plurality of localization rules 116*a*. For example, data validation component 118 may determine that the input social security number has 10-digits. Accordingly, data value 120 has an error 122. Suppose that in another data value, the employee indicated that he/she is not a citizen and is not a permanent resident. Based on the localization rules, this indicates that the employee should not have a social security number. Accordingly, the mere presence of the data value 120 would trigger an error. Errors 122 are provided to data review and rectification component 124, which generates and manages user interface 126.

In an exemplary aspects, data review and rectification component 124 generates, on user interface 126, an indication that the first user input requires review to complete the payroll transactions. In an exemplary aspects, user interface 126 displays a view of a geographical region and the indication is generated in a portion of the geographical region associated with the geographic location of the employee. In some aspects, the geographic location is a country and the geographic region is one or more continents.

Figure 2:
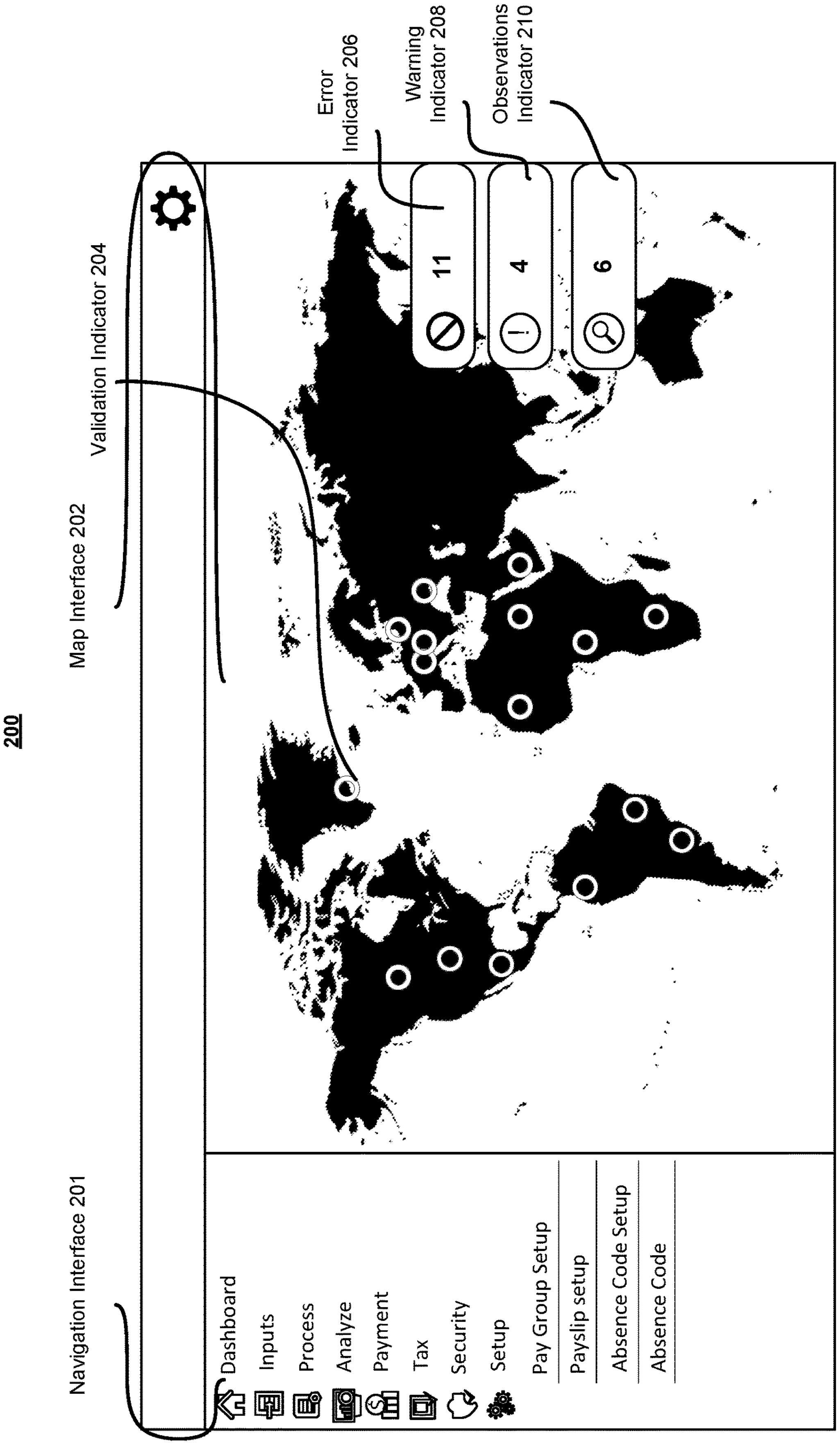
FIG. 2 is a diagram illustrating a graphical user interface (GUI) depicting the geographic region and various indicators associated with data validation.

FIG. 2 is a diagram 200 illustrating a graphical user interface (GUI) depicting the geographic region and various indicators associated with data validation. For example, diagram 200 depicts user interface 126 wherein the geographic region includes continents of the world and the geographic locations are individual countries. User interface 126 includes a navigation interface 201, which is a menu that allows a user (e.g., a company payroll officer) to view different types of information and perform various functions. The buttons in navigation interface 201 include dashboard, inputs, process, analyze, payment, tax, security, and setup. A sub-menu of the setup button includes buttons for pay group setup, payslip setup, absence code setup, and absence setup. When the dashboard button is selected, perpetual validation module 108 generates map interface 202.

User interface 126 depicts a plurality of indicators including validation indicator 204, error indicator 206, warning indicator 208, and observations indicator 210. When an employee provides a user input, perpetual validation module 108 validates the information and populates the indicators of use interface 126. For example, when an error is detected, the error count of error indicator 206 is incremented. When an error is resolved, the error count is decremented. As shown in FIG. 2, 11 errors are detected. When a warning is generated, the warning count of warning indicator 208 is incremented. While an error indicates that the invalid data value will prevent a payroll transaction from being completed, a warning indicates that the data value should be corrected even though it may not have an immediate negative affect on the payroll transaction. As an example, a social security number that has 10 digits may trigger an error, but a social security number for a non-citizen/non-permanent resident may trigger a warning. User interface 126 further has an observation indicator 210 that provides information about minor issues such as an incorrect data format (e.g., date should be Nov. 11, 2022 instead of 2022 Nov. 11). A user may select any of error indicator 206, warning indicator 208, and observations indicator 210 to view the erroneous data values, warned data values, and observed data values in a new window of user interface 126.

Validation indicator 204 is a marker generated on each geographic location associated with a given company. For example, a company may have 16 offices distributed over 16 countries. The employees from each office may provide data values for validation. In order to view the employee user inputs of a given geographic location, a user of map interface 202 may select validation indicator 204 of that geographic location.

In some aspects, validation indicator 204 may be represented by a shape such as a circle. In some aspects, validation indicator 204 may be color coded. For example, if a given office has more than a threshold amount of errors (e.g., 20% of entered data values), the indicator may be red. If a given office has less than the threshold amount of errors, the indicator may be green. Any number of visual effects (e.g., shading, textures, colors, etc.) and thresholds (e.g., 10%, 20%, etc.) can be applied to a validation indicator 204. The purpose is to allow the user to highlight the areas that are in immediate need of review.

Figure 3:
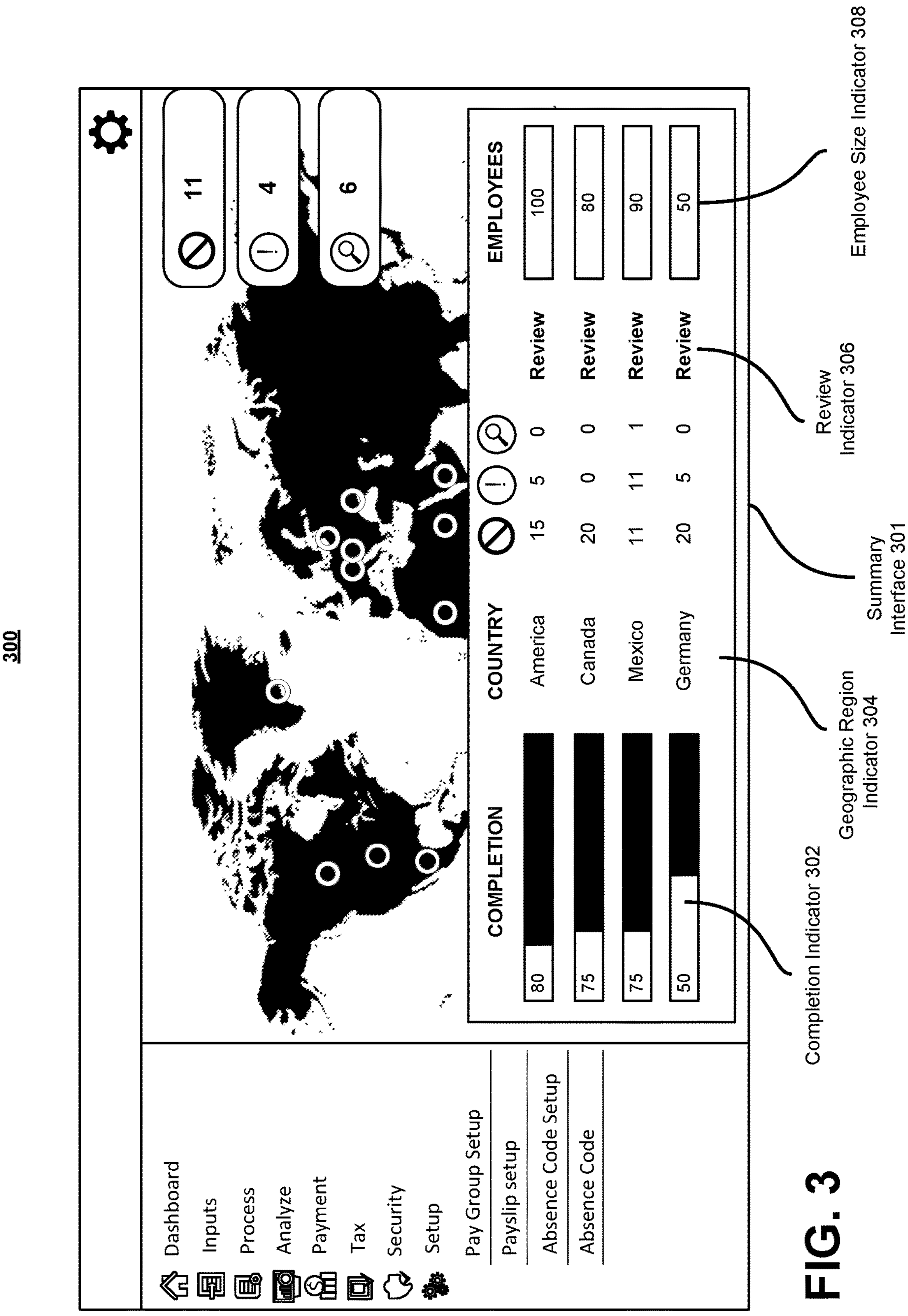
FIG. 3 is a diagram illustrating the GUI depicting the geographic region and additional indicators associated with data validation.

FIG. 3 is a diagram 300 illustrating the GUI depicting the geographic region and additional indicators associated with data validation. In addition to validation indicators, a user may opt to view a summary interface 301. Summary interface 301 lists each of the geographic locations (using geographic region indicator 304) and enables the user to view the individual errors, warnings, and observations counts of the geographic locations. Perpetual validation module 108 may also add a review indicator 306 to each of the items on the list to allow the user to navigate to a new window detailing the data values specific to that geographic location (errors, warnings, observations). In some aspects, summary interface 301 includes an employee size indicator 308 that lists the amount of unique employees in each geographic location. Each of these employees may provide user inputs to generate employee profiles. Completion indicator 302 provides an amount (e.g., percentage) of employee profiles that have no errors/warnings and do not need corrections.

For example, in FIG. 3, Canada has a completion rate of 75% which suggests that 75% of the 80 employees have entered fully valid data and have complete employee profiles (e.g., no errors). This means that 60 employees have entered data correctly and 20 have not. According to summary interface 301, all of those 20 employees have errors in their data values. Referring to Germany, which has 50 employees and a 50% completion rate, summary interface 301 indicates that 25 of the employee rates that remain to be completed include 20 with errors and 5 with warnings.

Figure 4:
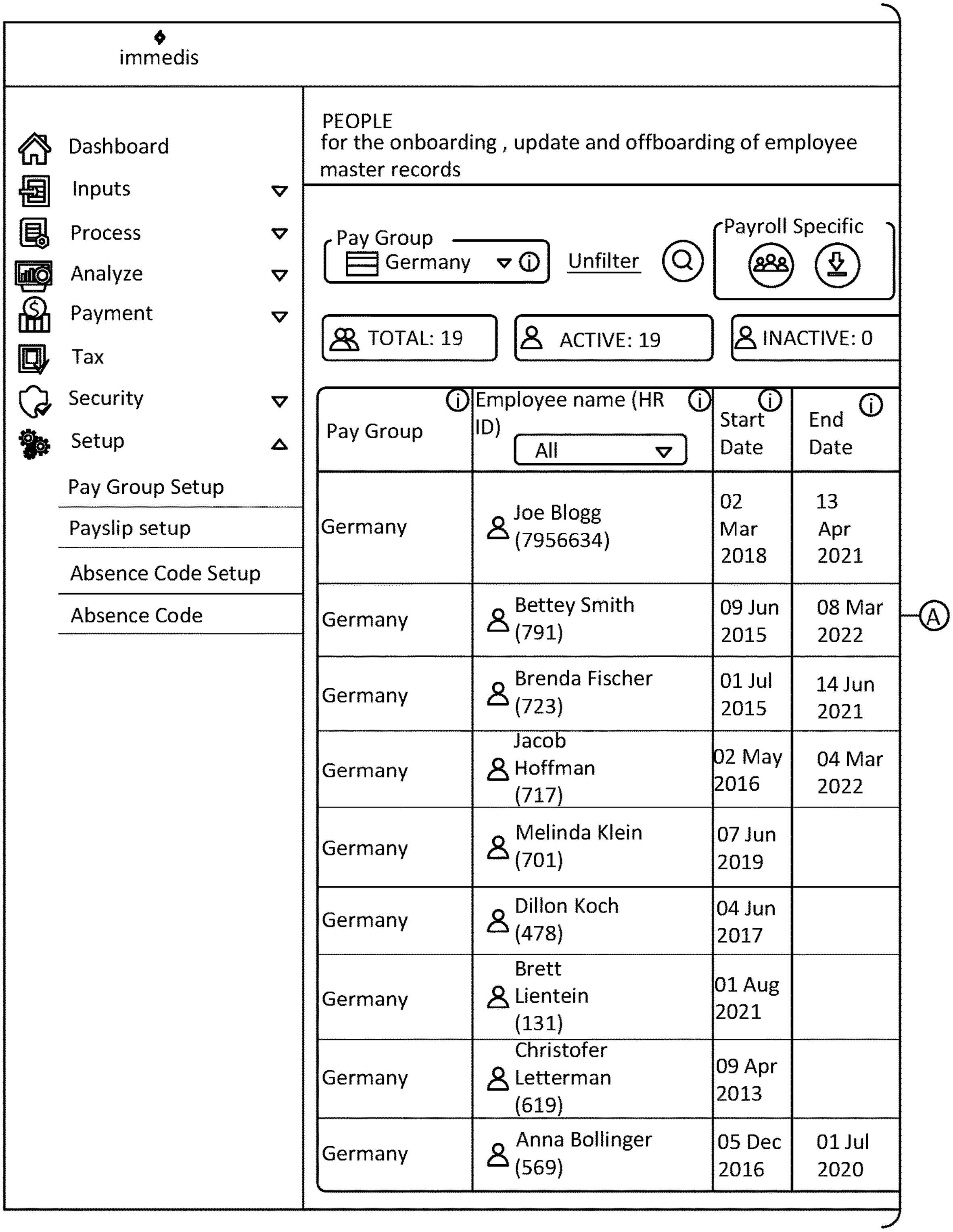
FIG. 4 is a diagram illustrating the GUI depicting validation results for a plurality of employees.
Figure 4:
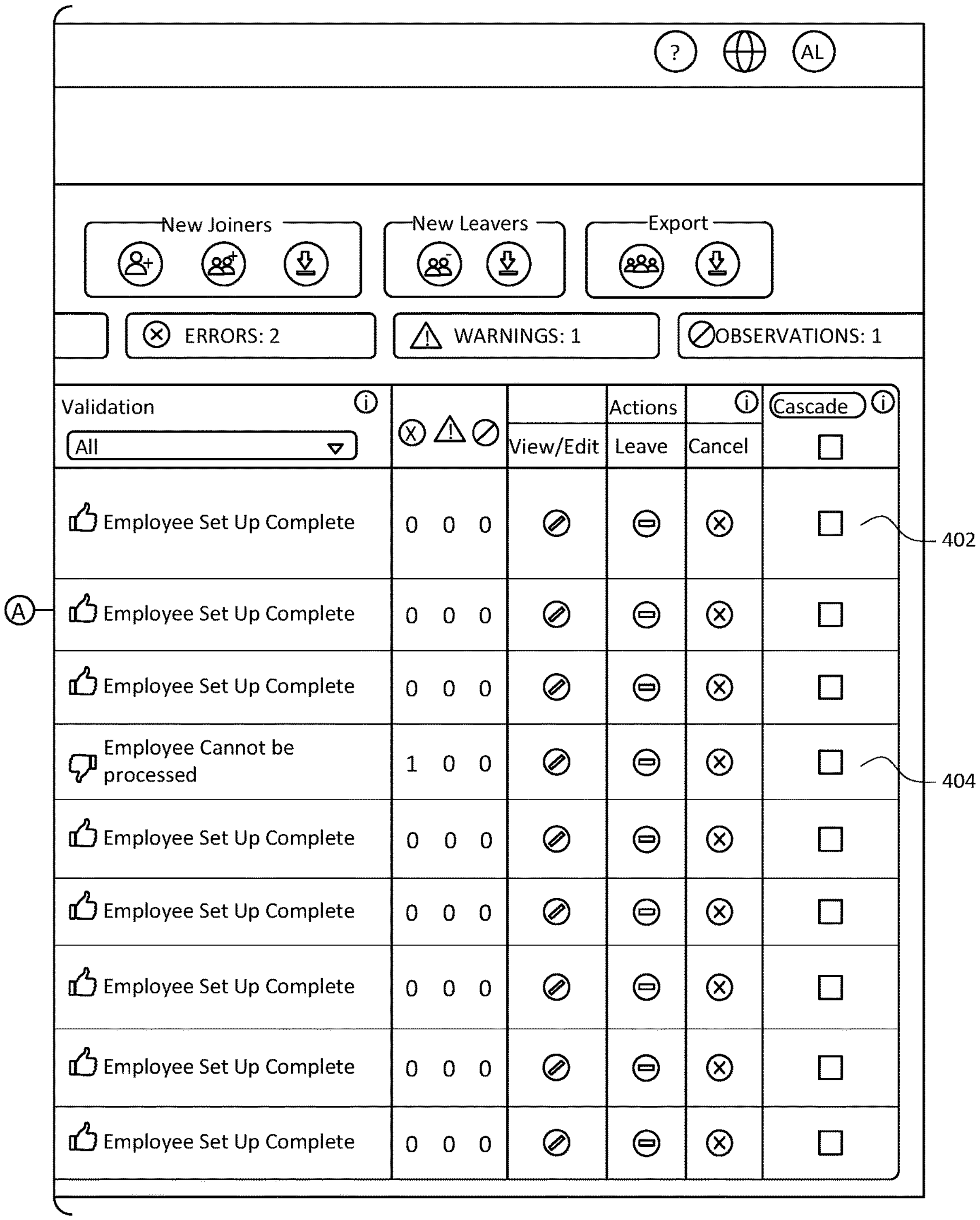

FIG. 4 is a diagram 400 illustrating the GUI depicting validation results for a plurality of employees. Suppose that a user selects the validation indicator 204 of Germany or review indicator 306 of Germany. In response to the selection, perpetual validation module 108 may generate a window that lists a plurality of employee profiles. For example, the first employee is Joe Blogg whose employee identification number is 7956634. The validation results state "employee set up complete," which indicates that Joe has entered data values that are valid and can be processed for payroll transactions. The entry for Joe is an example of a valid entry 402. In contrast, the fourth entry (e.g., Jacob Hoffman) has a validation result "employee cannot be processed." The tally columns suggest that there are three errors and one warning in Jacob's employee profile. A user may select the "view/edit" option in Jacob's row to view the employee profile. The entry for Jacob is an example of an invalid entry 404.

Figure 5:
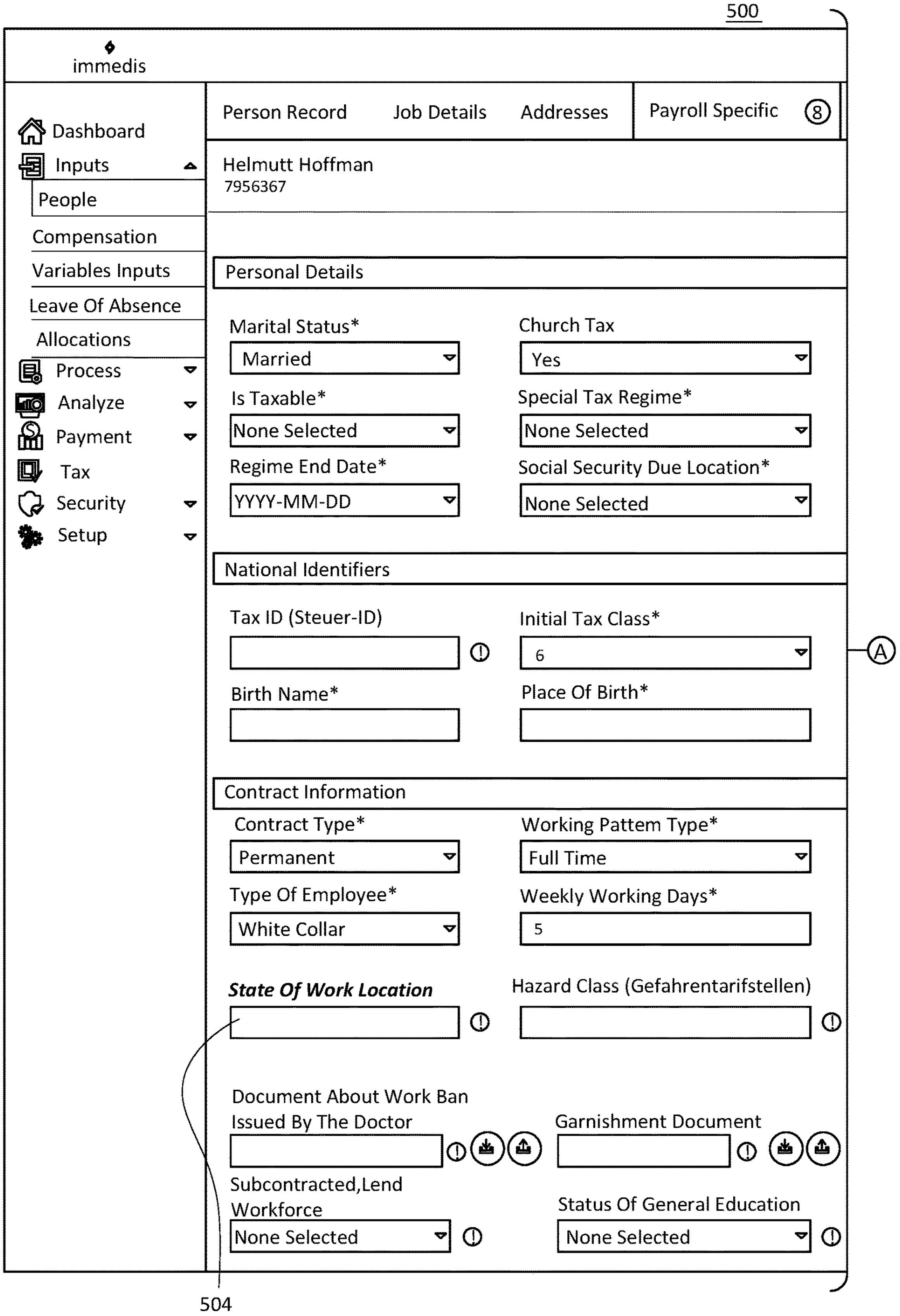
FIG. 5 is a diagram illustrating the GUI depicting erroneous data values.
Figure 5:
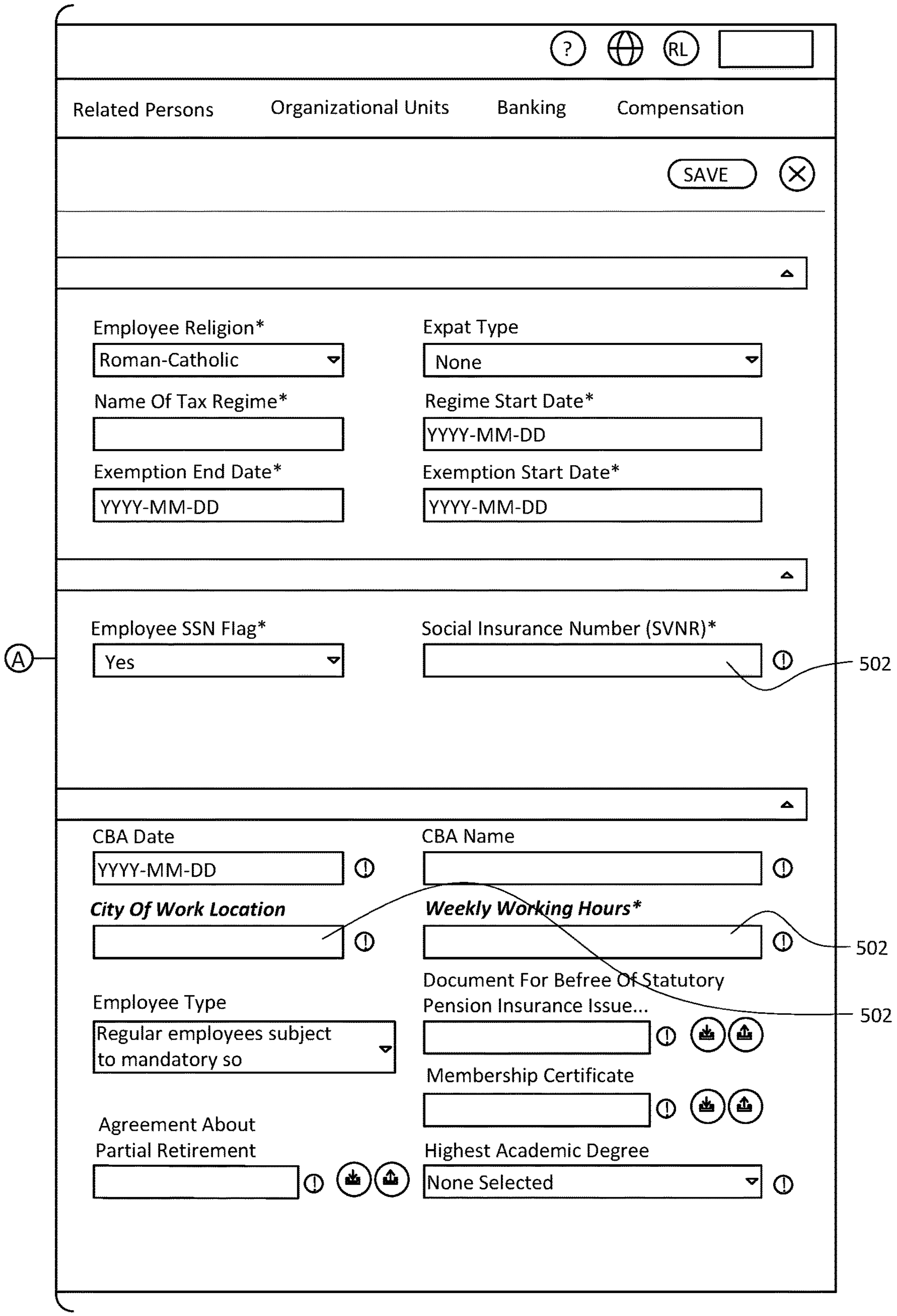

FIG. 5 is a diagram 500 illustrating the GUI depicting erroneous data values. FIG. 5 depicts a window of user interface 126 that is generated when the user selects the "view/edit" option in invalid entry 404. As can be seen, there are several data values collected from the employee. These data values include personal details (e.g., marital status, religion, etc.), national identifiers (e.g., Tax ID, Tax Class, social security number, etc.), and contract information (e.g., contract type, working days, work location, employee type, etc.).

Invalid entry 404 is generated because the employee failed to provide a social security number, city of work location, and weekly working hours. These are marked as error fields 502. In addition, there is a warning generated because the employee failed to provide a state of work location. This is marked as warning field 504. In some aspects, the error fields are visually marked/highlighted by an error icon or a color associated with error (e.g., red). In some aspects, the warning fields are visually marked/highlighted by a warning icon or a color associated with error (e.g., yellow).

It should be noted that the interface shown in FIG. 5 includes additional tabs on the top portion of the window (e.g., person record, job details, addresses, payroll specific, related persons, organizational units, banking, and compensation). A user may select one of these tabs to view that information about the employee. For example, the banking tab may be linked to a window that displays banking information (e.g., bank, account number, routing number, etc.). Errors, warnings, and observations may also be generated based on those data values. For example, if a user provides a routing number that is not linked to a bank, perpetual validation module 108 may generate validation results that highlight the erroneous routing number.

Figure 6:
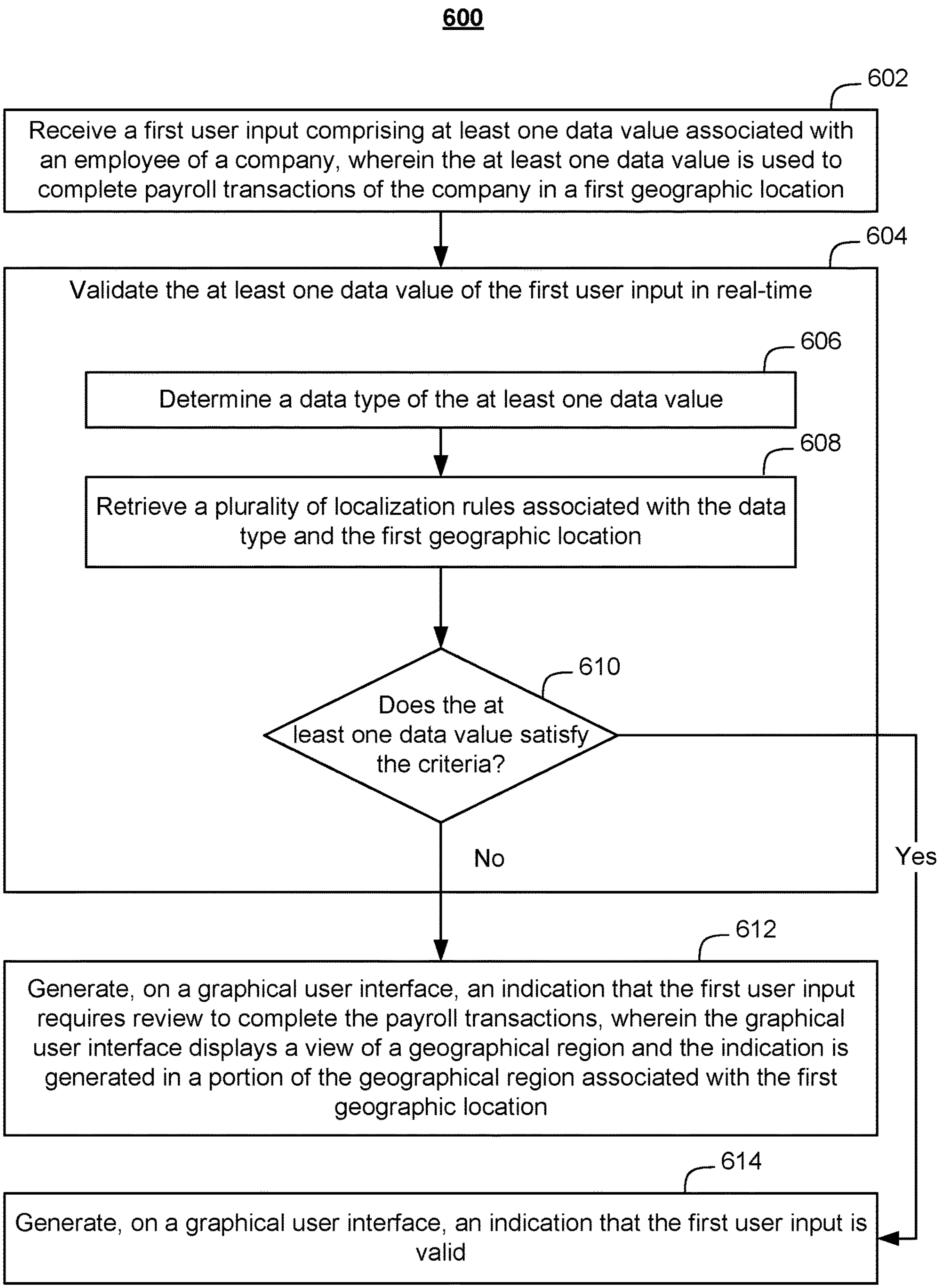
FIG. 6 illustrates a flow diagram of a method for validating payroll data.

FIG. 6 illustrates a flow diagram of a method 600 for validating payroll data. At 602, perpetual validation module 108 receives a first user input comprising at least one data value associated with an employee of a company, wherein the at least one data value is used to complete payroll transactions of the company in a first geographic location. For example, perpetual validation module 108 may receive user input 113 that includes data value 120 (e.g., a social security number). The first geographic location may be the United States and the company may have another office in a different country such as France.

While receiving the first user input, at 604, perpetual validation module 108 validates the at least one data value of the first user input in real-time. The validation at 604 includes steps 606, 608, and 610. At 606, perpetual validation module 108 determines a data type of the at least one data value. In some aspects, the data value may be accompanied by metadata that indicates the data type. For example, when the employee provides a data value such as their name, the field that he/she enters the name into in user interface 106 may be configured to receive a name. When stored in user input database 112, the name is stored in a column that includes a plurality of names. Accordingly, the metadata that accompanies each data value may include the data type under which the data value was either received via user interface 106 or stored in user input database 112. Suppose that data value 120 has a data type 114*a*.

At 608, perpetual validation module 108 retrieves a plurality of localization rules associated with the data type and the first geographic location. Rules 116*a* and rules 116*b* may be stored in a database of localization rules. Each rule may be tagged with a given data type and a given geographic location. When identifying the rules to retrieve, perpetual validation module 108 may search the database for rules that have both the data type tag and geographic location tag associated with data value 120. For example, rules 116*a* may each be tagged with data type 114*a* and the United States.

At 610, perpetual validation module 108 determines whether the at least one date value satisfies the criteria (i.e., validates whether the at least one data value satisfies criteria provided by the plurality of localization rules). The plurality of localization rules make up criteria that dictates whether a data value is entered correctly and can be used to process payroll transactions.

In some aspects, the at least one data value comprises a first data value and a second data value. For example, the first data value may indicate that the employee lives in the state of New York and the second data value may indicate that the employee's residential street address is 9999 John St. Perpetual validation module 108 may determine that the at least one data value does not satisfy the criteria in response to determining that the first data value contradicts and the second data value. For example, perpetual validation module 108 may determine that 9999 John St. does not exist in the state of New York.

In another example, the first data value may indicate that the employee has a job title such as "CEO" and the second data value may indicate that the employee is a part-time worker or a person paid hourly. The localization rules may indicate that a CEO must be full-time. Accordingly, the first data value contradicts with the second data value.

In yet another example, the first data value may indicate that employee has a bachelors degree and the second data value may indicate that the last education institution attended by the person is a high school. A localization rule may indicate that a bachelors degree requires the last attended education institution to be a college or a university. Accordingly, the first data value contradicts with the second data value.

In some aspects, the at least one data value is a national identification number of the employee. Foe example, the national identification number may be one of a passport number, a social security number, a driver license number, etc. Perpetual validation module 108 may determine that the at least one data value does not satisfy the criteria of rules 116*a* by determining that the national identification number has an invalid format. For example, the social security number may be a 9-digit number and the employee may have left the field blank, may have entered one too many or one too few digits via user interface 106. In another case, perpetual validation module 108 may determine that the at least one other data value satisfies criteria of a different plurality of localization rules (e.g., rules 116*b*) based on determining that the national identification number is not required to complete the payroll transactions. For example, in the United Kingdom, a social security number may not be necessary and may be replaced with a different national identification number. If the employee is a dual citizen in multiple countries, his/her entry for one geographic location may not affect his/her entry for a different geographic location.

In response to determining that the at least one data value does not satisfy the criteria, method 600 advances to 612, where perpetual validation module 108 generates, on a graphical user interface, an indication that the first user input requires review to complete the payroll transactions, wherein the graphical user interface displays a view of a geographical region and the indication is generated in a portion of the geographical region associated with the first geographic location.

In some aspects, determine an amount of the criteria that the at least one data value satisfies, wherein the indication generated on the graphical user interface is a visual marker that depicts the amount of the criteria that the at least one data value satisfies.

In response to determining that the at least one data value does satisfy the criteria, method 600 advances from 610 to 614, where perpetual validation module 108 generates, on a graphical user interface, an indication that the first user input is valid.

Figure 7:
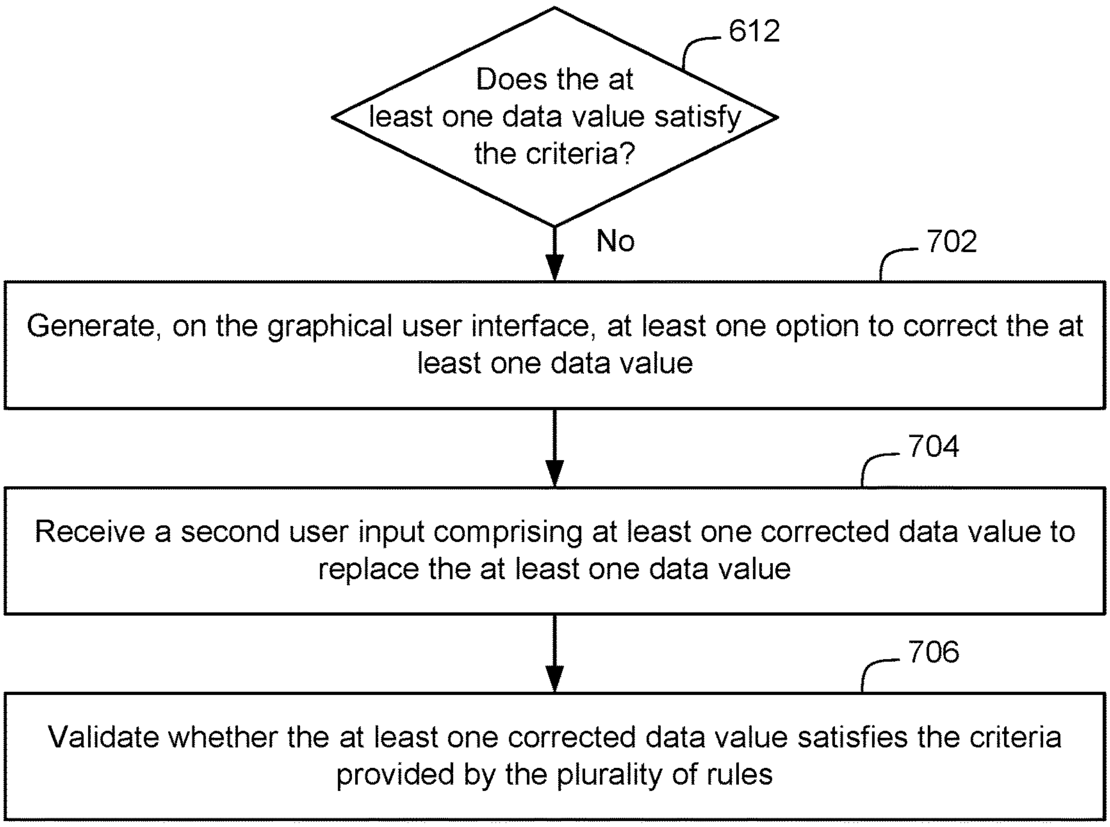
FIG. 7 illustrates a flow diagram of a method for validating corrected payroll data.

FIG. 7 illustrates a flow diagram of a method 700 for validating corrected payroll data. Method 700 is initiated in addition to step 612. For example, in response to determining that the at least one data value does not satisfy the criteria, at 702, perpetual validation module 108 generates, on the graphical user interface, at least one option to correct the at least one data value. For example, the user may select validation indicator 204, error indicator 206, warnings indicator 208, and/or review indicator 306 to access the erroneous data values. This may open the window shown in FIG. 5.

At 704, perpetual validation module 108 receives a second user input comprising at least one corrected data value to replace the at least one data value. For example, the user may enter a corrected social security number and fill the remaining error fields 502 and warning field 504.

At 706, perpetual validation module 108 validates whether the at least one corrected data value satisfies the criteria provided by the plurality of rules. For example, perpetual validation module 108 may determine whether the corrected social security number meets the rules associated with social security number criteria.

Figure 8:
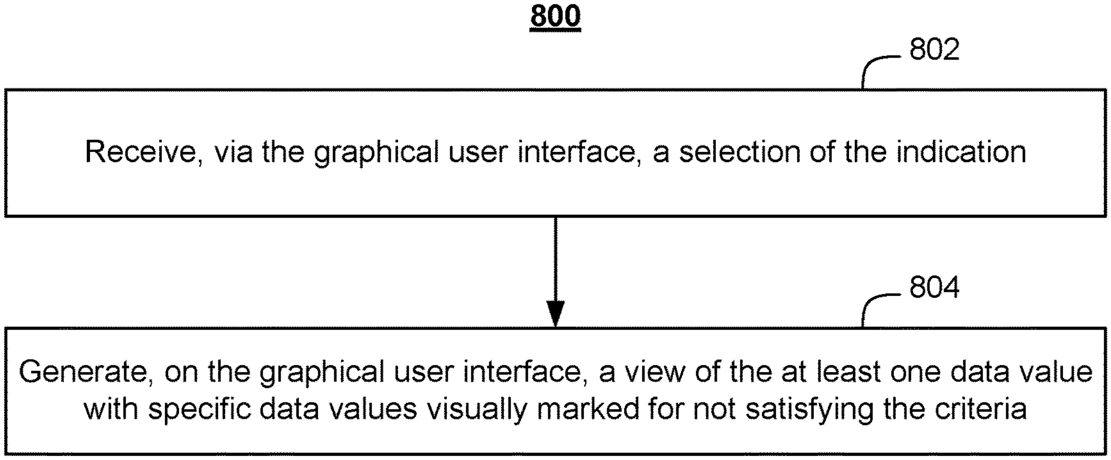
FIG. 8 illustrates a flow diagram of a method for generating a graphical user interface depicted validated and unvalidated payroll data.

FIG. 8 illustrates a flow diagram of a method 800 for generating a graphical user interface depicted validated and unvalidated payroll data. Method 800 may be initiated after step 612 of method 600. At 802, perpetual validation module 108 receives, via the graphical user interface, a selection of the indication. For example, the user may select validation indicator 204. At 804, perpetual validation module 108 generates, on the graphical user interface, a view of the at least one data value with specific data values visually marked for not satisfying the criteria. For example, perpetual validation module 108 may generate the window shown in FIG. 5 and marking error fields 502 and warning field 504.

Figure 9:
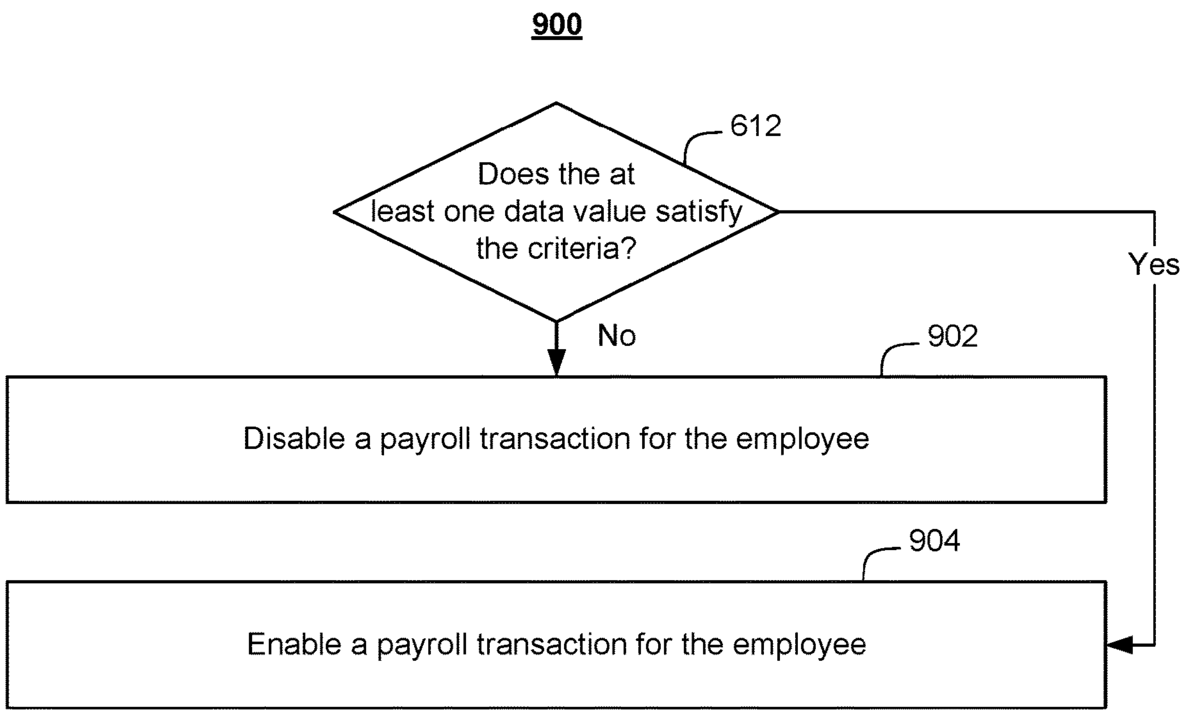
FIG. 9 illustrates a flow diagram of a method for enabling and disabling a payroll transaction based on validated payroll data.

FIG. 9 illustrates a flow diagram of a method 900 for enabling and disabling a payroll transaction based on validated payroll data. Method 900 may be initiated in addition to step 612 and 614. For example, in response to determining that the at least one data value does not satisfy the criteria, perpetual validation module 108 may execute step 612 and 902, where perpetual validation module 108 disables a payroll transaction for the employee. For example, if a marital status is missing, perpetual validation module 108 may be unable to determine how much tax to apply to an employee's salary. Accordingly, perpetual validation module 108 may disable the payroll transaction for the employee until the data value is provided.

Alternatively, in response to determining that the at least one data value does satisfy the criteria, perpetual validation module 108 may execute step 614 and 904, where perpetual validation module 108 enables a payroll transaction for the employee.

Figure 10:
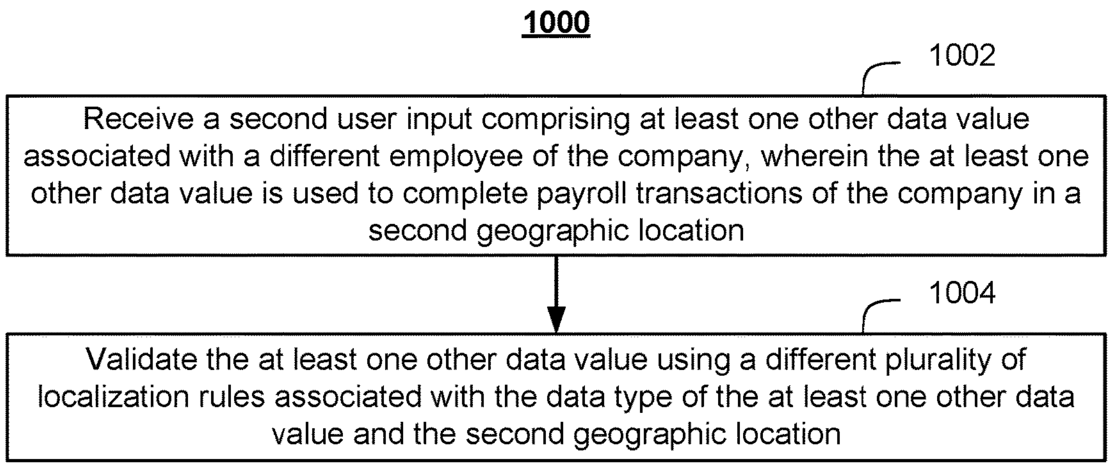
FIG. 10 illustrates a flow diagram of a method for validating payroll data of a different employee in a different geographic location.

FIG. 10 illustrates a flow diagram of a method 1000 for validating payroll data of a different employee in a different geographic location. Method 1000 may be initiated after step 612 and/or 614. At 1002, perpetual validation module 108 receives a second user input comprising at least one other data value associated with a different employee of the company, wherein the at least one other data value is used to complete payroll transactions of the company in a second geographic location. Suppose that a different employee enters their own information to create and populate an employee profile. The different employee may be located in a different country, but may still be part of the same company or pay group. At 1004, perpetual validation module 108 validates the at least one other data value using a different plurality of localization rules associated with the data type of the at least one other data value and the second geographic location. For example, the data value provided may be a national identification number such as a driver license number. In the country of the different employee, the driver license number may be enough to process a payroll transaction (in place of a social security number). Accordingly, a different set of localization rules need to be applied for the data values provided by the different employee.

Figure 11:
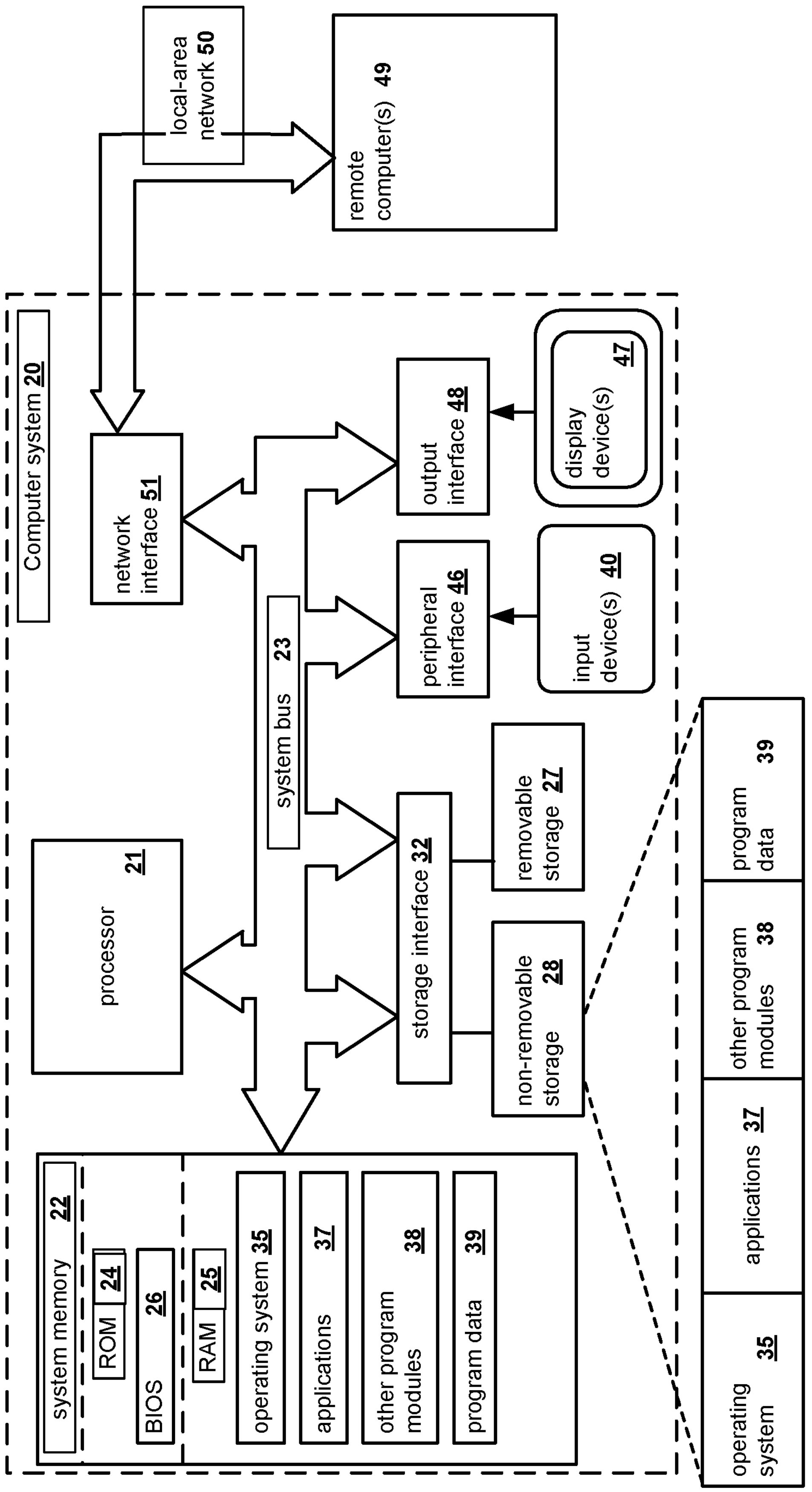
FIG. 11 presents an example of a general-purpose computer system on which aspects of the present disclosure can be implemented.

FIG. 11 is a block diagram illustrating a computer system 20 on which aspects of systems and methods for payroll data validation may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-10 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A system for payroll data validation, comprising:

at least one memory;

at least one hardware processor coupled with the at least one memory, the display device, and the network interface, and configured, individually or in combination, to:

receive, via the network interface, a first user input specifying at least one data value associated with an employee of a company, wherein the at least one data value is used to complete payroll transactions of the company in a first geographic location, and wherein the at least one data value comprises a national identification number of the employee;

while receiving the first user input, validate in real-time the at least one data value of the first user input by:

determining a data type of the at least one data value;

retrieving a plurality of localization rules associated with the data type and the first geographic location, each of the plurality of localization rules defining a respective compliance criterion; and validating whether the at least one data value satisfies the respective compliance criterion provided by each of the plurality of localization rules;

in response to determining that the at least one data value does not satisfy the respective compliance criterion of at least one localization rule of the plurality of localization rules, wherein determining that the at least one data value does not satisfy the respective compliance criterion comprises determining that the national identification number has an invalid format, generate and overlay on a graphical user interface rendered on the display device an indication that the first user input requires review to complete the payroll transactions, wherein the graphical user interface displays a view of a geographical region, and the indication is overlayed on a portion of the geographical region associated with the first geographic location;

wherein the indication comprises a validation indicator overlaid on the portion of the geographical region, the validation indicator having a visual effect applied thereto based on whether the first geographic location has more than a threshold amount of errors, the visual effect visually distinguishing the first geographic location as being in need of review;

receive, via the graphical user interface, a selection of the indication; and generate, on the graphical user interface, a view of the at least one data value visually marked for correction and at least one option to correct the at least one data value;

receive a second user input specifying at least one corrected data value to replace the at least one data value;

validate whether the at least one corrected data value satisfies the respective compliance criterion provided by each of the plurality of localization rules;

receive a third user input specifying at least one other data value associated with a different employee of the company, wherein the at least one other data value is used to complete payroll transactions of the company in a second geographic location; and validate the at least one other data value using a different plurality of localization rules associated with a data type of the at least one other data value and the second geographic location, wherein determining that the at least one other data value satisfies respective compliance criteria of the different plurality of localization rules comprises determining that a national identification number is not required to complete the payroll transactions in the second geographic location.

2. The system of claim 1, wherein the at least one hardware processor is further configured to:

determine an amount of the criteria that the at least one data value satisfies, wherein the indication generated on the graphical user interface is a visual marker that depicts the amount of the criteria that the at least one data value satisfies.

3. The system of claim 1, wherein the at least one data value comprises a first data value and a second data value, wherein the at least one hardware processor is further configured to determine that the at least one data value does not satisfy the criteria in response to determining that the first data value contradicts the second data value.

4. The system of claim 1, wherein the at least one hardware processor is configured to:

disable a payroll transaction for the employee in response to determining that the at least one data value does not satisfy the criteria.

5. The system of claim 1, wherein the at least one hardware processor is configured to:

enable a payroll transaction for the employee in response to determining that the at least one data value satisfies the criteria.

6. The system of claim 1, wherein the first geographic location is a country, the geographical region is one or more continents, and the view of the geographical region comprises a map interface.

7. A method for payroll data validation, comprising:

receiving, via a network interface, a first user input specifying at least one data value associated with an employee of a company, wherein the at least one data value is used to complete payroll transactions of the company in a first geographic location, and wherein the at least one data value comprises a national identification number of the employee;

while receiving the first user input, validate in real-time the at least one data value of the first user input by:

determining a data type of the at least one data value;

retrieving a plurality of localization rules associated with the data type and the first geographic location, each of the plurality of localization rules defining a respective compliance criterion; and validating whether the at least one data value satisfies the respective compliance criterion provided by each of the plurality of localization rules;

in response to determining that the at least one data value does not satisfy the respective compliance criterion of at least one localization rule of the plurality of localization rules, wherein determining that the at least one data value does not satisfy the respective compliance criterion comprises determining that the national identification number has an invalid format, generate and overlay on a graphical user interface rendered on a display device an indication that the first user input requires review to complete the payroll transactions, wherein the graphical user interface displays a view of a geographical region, and the indication is overlayed on a portion of the geographical region associated with the first geographic location;

wherein the indication comprises a validation indicator overlaid on the portion of the geographical region, the validation indicator having a visual effect applied thereto based on whether the first geographic location has more than a threshold amount of errors, the visual effect visually distinguishing the first geographic location as being in need of review;

receive, via the graphical user interface, a selection of the indication; and generate, on the graphical user interface, a view of the at least one data value visually marked for correction and at least one option to correct the at least one data value;

receive a second user input specifying at least one corrected data value to replace the at least one data value;

validate whether the at least one corrected data value satisfies the respective compliance criterion provided by each of the plurality of localization rules;

receive a third user input specifying at least one other data value associated with a different employee of the company, wherein the at least one other data value is used to complete payroll transactions of the company in a second geographic location; and validate the at least one other data value using a different plurality of localization rules associated with a data type of the at least one other data value and the second geographic location, wherein determining that the at least one other data value satisfies respective compliance criteria of the different plurality of localization rules comprises determining that a national identification number is not required to complete the payroll transactions in the second geographic location.

8. The method of claim 7, further comprising:

determining an amount of the criteria that the at least one data value satisfies, wherein the indication generated on the graphical user interface is a visual marker that depicts the amount of the criteria that the at least one data value satisfies.

9. The method of claim 7, wherein the at least one data value comprises a first data value and a second data value, further comprising determining that the at least one data value does not satisfy the criteria in response to determining that the first data value contradicts the second data value.

10. The method of claim 7, further comprising:

disabling a payroll transaction for the employee in response to determining that the at least one data value does not satisfy the criteria.

11. The method of claim 7, further comprising: enabling a payroll transaction for the employee in response to determining that the at least one data value satisfies the criteria.

12. The method of claim 7, wherein the first geographic location is a country, the geographical region is one or more continents, and the view of the geographical region comprises a map interface.

13. A non-transitory computer readable medium storing thereon computer executable instructions for payroll data validation, including instructions for:

receive, via a network interface, a first user input specifying at least one data value associated with an employee of a company, wherein the at least one data value is used to complete payroll transactions of the company in a first geographic location, and wherein the at least one data value comprises a national identification number of the employee;

while receiving the first user input, validate in real-time the at least one data value of the first user input by:

determining a data type of the at least one data value;

retrieving a plurality of localization rules associated with the data type and the first geographic location, each of the plurality of localization rules defining a respective compliance criterion; and validating whether the at least one data value satisfies the respective compliance criterion provided by each of the plurality of localization rules;

in response to determining that the at least one data value does not satisfy the respective compliance criterion of at least one localization rule of the plurality of localization rules, wherein determining that the at least one data value does not satisfy the respective compliance criterion comprises determining that the national identification number has an invalid format, generate and overlay on a graphical user interface rendered on a display device an indication that the first user input requires review to complete the payroll transactions, wherein the graphical user interface displays a view of a geographical region, and the indication is overlayed on a portion of the geographical region associated with the first geographic location;

wherein the indication comprises a validation indicator overlaid on the portion of the geographical region, the validation indicator having a visual effect applied thereto based on whether the first geographic location has more than a threshold amount of errors, the visual effect visually distinguishing the first geographic location as being in need of review;

receive, via the graphical user interface, a selection of the indication; and generate, on the graphical user interface, a view of the at least one data value visually marked for correction and at least one option to correct the at least one data value;

receive a second user input specifying at least one corrected data value to replace the at least one data value;

validate whether the at least one corrected data value satisfies the respective compliance criterion provided by each of the plurality of localization rules;

receive a third user input specifying at least one other data value associated with a different employee of the company, wherein the at least one other data value is used to complete payroll transactions of the company in a second geographic location; and validate the at least one other data value using a different plurality of localization rules associated with a data type of the at least one other data value and the second geographic location, wherein determining that the at least one other data value satisfies respective compliance criteria of the different plurality of localization rules comprises determining that a national identification number is not required to complete the payroll transactions in the second geographic location.

14. The non-transitory computer readable medium of claim 13, further including instructions for determining an amount of the criteria that the at least one data value satisfies, wherein the indication generated on the graphical user interface is a visual marker that depicts the amount of the criteria that the at least one data value satisfies.

15. The non-transitory computer readable medium of claim 13, wherein the at least one data value comprises a first data value and a second data value, and further including instructions for determining that the at least one data value does not satisfy the criteria in response to determining that the first data value contradicts the second data value.

16. The non-transitory computer readable medium of claim 13, further including instructions for disabling a payroll transaction for the employee in response to determining that the at least one data value does not satisfy the criteria.

17. The non-transitory computer readable medium of claim 13, further including instructions for enabling a payroll transaction for the employee in response to determining that the at least one data value satisfies the criteria.

18. The non-transitory computer readable medium of claim 13, wherein the first geographic location is a country, the geographical region is one or more continents, and the view of the geographical region comprises a map interface.

* * * * *